United States Patent Office 2,743,209
Patented Apr. 24, 1956

2,743,209

XANTHYL AND TRITHIOCARBONYL, SULFIDES, SULFOXIDES, AND SULFONES AS PESTICIDES

Robert H. Jones, Irvington, and Silvio L. Giolito, New York, N. Y.

No Drawing. Application December 24, 1952,
Serial No. 327,921

7 Claims. (Cl. 167—22)

This invention relates to a novel group of pesticide compositions and particularly relates to the use of trithiocarbonyl and xanthyl sulfides, sulfoxides, and sulfones as pesticides.

The compounds of the present invention which have found utility as pesticides have the following general formula:

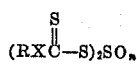

In this formula, $n$ is 0, 1 or 2, X is oxygen or sulfur and each R represents an organic radical which may be an aliphatic radical, saturated or unsaturated, having from 1 to 18 carbon atoms, a cycloparaffin radical, an aryl radical or an aralkyl radical, any of which may contain further substituents such as halogen atoms, and may have an organic radical linked to R by an oxygen bridge. Those compounds wherein $n$ is equal to 0 are sulfides, those wherein $n$ is equal to 1 are sulfoxides, and those wherein $n$ is equal to 2 are sulfones those compounds wherein X is oxygen are xanthyl compounds, while those in which X is sulfur are trithiocarbonyl compounds.

Typical compounds falling within the scope of this invention include the following: (To facilitate references to the compounds throughout the balance of the specification, code numbers have been assigned to these compounds as listed below.)

Xanthyl sulfides:
    466 methyl xanthyl sulfide
    507 n-propyl xanthyl sulfide
    508 n-amyl xanthyl sulfide
    592 secondary octyl xanthyl sulfide
    590 lauryl xanthyl sulfide
    565 allyl xanthyl sulfide
    554 cyclohexyl xanthyl sulfide
    467 phenyl xanthyl sulfide
    509 p-chlorophenyl xanthyl sulfide
    510 2,4-dichlorophenyl xanthyl sulfide
    598 phenoxyethyl xanthyl sulfide
    602 benzyl xanthyl sulfide Xanthyl sulfoxides:
    578 methyl xanthyl sulfoxide
    579 butyl xanthyl sulfoxide
    662 allyl xanthyl sulfoxide
Xanthyl sulfones:
    572 methyl xanthyl sulfone
    577 butyl xanthyl sulfone
    591 lauryl xanthyl sulfone
    661 allyl xanthyl sulfone
Trithiocarbonyl sulfides:
    471 methyl trithiocarbonyl sulfide
    596 tert butyl trithiocarbonyl sulfide
    472 n-lauryl trithiocarbonyl sulfide
Trithiocarbonyl sulfoxides:
    597 tert butyl trithiocarbonyl sulfoxide
    609 methyl trithiocarbonyl sulfoxide
Trithiocarbonyl sulfones:
    595 tertiary butyl trithiocarbonyl sulfone
    607 methyl trithiocarbonyl sulfone.

Although the method of preparation of the compounds does not form a part of the present invention, it may be mentioned that the sulfides may be readily prepared by the reaction between a salt, such as the potassium salt, of the desired xanthate or trithiocarbonate with sulfur dichloride, according to the following scheme:

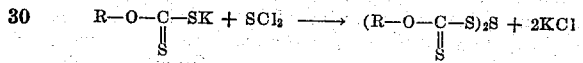

Analogous reactions can be used to prepare the sulfones and sulfoxides. In the case of the sulfones, the metallic salt of the trithiocarbonate or xanthate is reacted with sulfuryl chloride (SO₂Cl₂), while to prepare the sulfoxides, the metal salts are reacted with thionyl chloride (SOCl₂).

The compositions of the present invention have been extensively tested as fungicides, insecticides, nematocides and acaracides. The method of conducting these tests and the data obtained from the tests are set forth below.

*Agar plate test*

In testing compounds for fungitoxicity in this method, the compound is dispersed evenly through 20 ml. of warm potato dextrose agar in a petri dish. A series of plates containing various concentrations of the compound are prepared for each fungus species used. When the agar has cooled and solidified the center of each plate is seeded with a few spores of the desired fungus. After seven days' incubation in the dark under controlled temperatures, the diameter of the fungus colony on each plate is measured and the relationship between the growth on each plate and that of an untreated but seeded control plate is recorded as per cent control (or per cent inhibition of growth). When applied to the compounds of the present invention, the following data were obtained:

| Compound | p. p. m. A. niger | | | | p. p. m. S. Fructicola | | | | p. p. m. Stemphylium sp. | | | |
|---|---|---|---|---|---|---|---|---|---|---|---|---|
| | 500 | 100 | 50 | 25 | 500 | 100 | 50 | 25 | 500 | 100 | 50 | 25 |
| Xanthyl Sulfides: | | | | | | | | | | | | |
| 466 | 100 | 100 | 65 | 17 | 100 | 100 | 100 | 100 | 100 | 100 | 100 | 100 |
| 507 | 30 | 19 | 7 | | 58 | 48 | 38 | 27 | 59 | 50 | 36 | 29 |
| 508 | | | | | 32 | 27 | 13 | 8 | 14 | 7 | | |
| 592 | 7 | | | | 14 | 8 | | | 37 | 7 | | |
| 590 | 23 | | | | 62 | 58 | 15 | | 42 | 15 | | |
| 565 | 100 | 100 | 100 | 56 | 100 | 100 | 100 | 100 | 100 | 100 | 100 | 70 |
| 554 | | | | | 37 | 18 | 15 | | 11 | 11 | 11 | |
| 467 | 100 | 100 | 100 | 100 | 100 | 100 | 100 | 100 | 100 | 100 | 100 | 100 |
| 509 | 100 | 23 | 9 | | 100 | 100 | 100 | | 100 | 100 | 31 | 1 |
| 510 | 100 | 100 | 100 | 19 | 100 | 100 | 100 | 100 | 100 | 100 | 100 | 49 |
| 598 | 19 | | | | 40 | 16 | | | 8 | | | |
| 602 | 8 | | | | 12 | | | | 19 | 19 | 8 | 8 |
| Xanthyl sulfoxides: | | | | | | | | | | | | |
| 578 | 100 | | 100 | 79 | 100 | 100 | 100 | 100 | 100 | 100 | 100 | 100 |
| 579 | 38 | 33 | 33 | 7 | 7 | 7 | | | 13 | 13 | 10 | |
| 662 | 100 | 100 | 100 | 44 | 100 | 100 | 100 | 86 | 100 | 100 | 100 | 88 |
| Xanthyl sulfones: | | | | | | | | | | | | |
| 572 | 100 | 100 | 100 | 73 | 100 | 100 | 100 | 100 | 100 | 100 | 100 | 100 |
| 577 | 42 | 40 | 36 | 18 | 20 | 7 | | | 13 | 11 | | |
| 591 | 20 | | | | 69 | 22 | 22 | | 69 | 30 | | |
| 661 | 100 | 100 | 100 | 100 | 100 | 100 | 100 | 93 | 100 | 100 | 100 | 98 |
| Trithiocarbonyl sulfides: | | | | | | | | | | | | |
| 471 | 100 | 100 | 48 | 13 | 100 | 100 | 100 | 20 | 100 | 100 | 100 | 100 |
| 596 | | | | | 21 | 21 | | | 19 | 17 | | |
| 472 | 22 | 22 | | | 15 | 5 | | | 21 | | | |
| Trithiocarbonyl sulfoxides: | | | | | | | | | | | | |
| 597 | | | | | 28 | 28 | | | 22 | 14 | 8 | 3 |
| Trithiocarbonyl sulfones: | | | | | | | | | | | | |
| 595 | 14 | | | | 49 | 47 | 29 | 15 | 12 | 10 | | |
| 607 | 100 | 54 | 61 | 54 | 100 | 100 | 40 | 16 | 83 | 97 | 100 | 100 |

Pinto bean tests

Pinto bean plants sprouted and grown seven days in a bottom-heated sand bed in the greenhouse are potted two plants per 3" pot. Three days after transplanting, the terminal growth is pinched from each plant, leaving the two primary leaves.

The chemicals which are to be tested are sprayed on both the upper and lower surfaces of the primary leaves as an aqueous dispersion. A small quantity of wetting agent is included in the dispersant (distilled water), and care is taken to assure small particle size of the test compound.

After the deposit has dried, duplicate pots of plants from each concentration are inoculated with the test fungi, *Uromyces phaseoli* (bean rust) and *Erysiphe polygoni* (bean powdery mildew). The plants inoculated with mildew are placed directly in the greenhouse, while the rust-inoculated plants are incubated in a high-humidity chamber for 18 hours before removal to the greenhouse.

Readings of control are taken 10 days following spraying and inoculation and are expressed as per cent control as compared with untreated checks. The following data were obtained:

| Compound | Rust, p. p. m. | | | Mildew, p. p. m. | | |
|---|---|---|---|---|---|---|
| | 1,000 | 500 | 100 | 1,000 | 500 | 100 |
| 466 | | | | 20 | 100 | 60 |
| 507 | 10 | | | 95 | 85 | 10 |
| 508 | 100 | 75 | | 100 | 90 | 10 |
| 592 | 60 | 10 | | 75 | 75 | 50 |
| 590 | 100 | 100 | 100 | 90 | 75 | 25 |
| 565 | 50 | | | 50 | 25 | |
| 554 | 75 | | | 90 | 50 | |
| 467 | | | | 20 | | |
| 510 | 30 | | | 20 | | |
| 598 | 75 | 25 | | 90 | 75 | 50 |
| 602 | | | | 90 | 25 | |
| 597 | | | 100 | | 100 | 100 |
| 572 | 100 | 75 | | 50 | 50 | 25 |
| 577 | | | | 100 | | 100 |
| 471 | | | | 40 | 20 | |
| 597 | | | 100 | | 100 | 75 |
| 592 | | | 50 | | 100 | 25 |

Insect test

Acetone solutions of the compounds are dispersed in water that has 0.015% Vatsol OT wetting agent and 0.005% Methocel (25 cps.) dissolved in it. The water dispersion of the compound is sprayed onto the insects with a De Vilbiss hand sprayer at a concentration of 0.5%. The insects are held in the sprayed cages for 72 hours. Mortality counts are made at 72 hours and the results reported as percentage of insects killed. The following data were obtained:

| Compound | Housefly | Amer. Roach | Milkweed Bug | Confused Flour Beetle | Bean Aphid |
|---|---|---|---|---|---|
| 466 | 100 | 30 | 20 | 84 | 20 |
| 507 | 100 | 10 | | 100 | 90 |
| 508 | 32 | | | 100 | 65 |
| 592 | 12 | | 26 | | |
| 590 | 4 | | 30 | | |
| 565 | 56 | 30 | 10 | 100 | |
| 467 | 84 | 10 | | 100 | 65 |
| 509 | 4 | | | | 20 |
| 510 | 40 | 20 | 10 | | 20 |
| 602 | 4 | 10 | | | |
| 578 | 100 | 10 | 40 | 100 | 20 |
| 579 | 72 | | 50 | | 20 |
| 572 | 100 | 20 | 10 | 100 | 20 |
| 577 | 100 | 10 | 20 | 60 | 65 |
| 591 | | | 10 | | |
| 661 | 72 | 40 | | 100 | |
| 471 | 16 | 10 | | 75 | 90 |
| 472 | 4 | | 10 | | |
| 595 | 32 | | 10 | 100 | |
| 662 | 100 | 30 | 40 | 40 | 50 |

Fumigation test

*Fungicidal in vitro tests.*—Glass microbeakers containing 100 mg. of the test compound are placed in petri dishes which contain 20 ml. potato dextrose agar. Spores of *Aspergillus niger* are seeded on the surface of the agar and allowed to germinate and develop normally. After seven days' growth in an atmosphere in which the test compound is allowed to volatilize freely, the inhibition of growth as compared to the control plates is visually estimated and recorded as per cent control. The following data were obtained:

| Compound: | Per cent control |
|---|---|
| 466 | 100 |
| 467 | 100 |
| 509 | 80 |
| 510 | 100 |
| 471 | 100 |
| 578 | 100 |
| 662 | 100 |
| 572 | 100 |

Nematocidal test

Small portions of dried tomato stems containing heavy infestation of root-knot type nematodes (*Meloidogyne sp.*) were imbedded in 600 gm. of loam soil and sealed in quart Mason jars. The compounds are thoroughly mixed with the soil in each jar, being first adsorbed on coarse sand. The concentration is 160 p. p. m. After 48 hours fumigation, the soil from each jar is placed in a 4½" unglazed clay pot and removed to the greenhouse. After cautious watering for seven days, tomato transplants are placed in each pot. These plants are removed after a minimum of 21 days, the roots are washed, and an index of infection recorded. Control is expressed as a percentage, based on untreated checks. The following data were obtained:

| Compound: | 160 p. p. m. |
|---|---|
| 466 | 100 |
| 508 | 50 |
| 467 | 100 |
| 471 | 100 |
| 592 | 75 |
| 565 | 100 |
| 509 | 75 |
| 510 | 100 |
| 602 | 100 |
| 578 | 100 |
| 572 | 100 |
| 596 | 100 |
| 597 | 90 |
| 595 | 100 |
| 607 | 50 |

Mite test

Potted pinto bean plants heavily infested with the two-spotted mite, *Tetranychus bimaculatus* (Harvey), were sprayed with various concentrations of the compounds under test in an aqueous suspension. Observations were made twelve days after spraying and the number of live mites counted. The results were expressed as a percentage based on untreated checks, 100 representing no live mites and "0" representing no control; the following data were obtained:

| Compound | Concentration | | |
|---|---|---|---|
| | 0.25% | 0.12% | 0.06% |
| 466 | | 100 | 90 |
| 507 | | 40 | 20 |
| 508 | 100 | 90 | 65 |
| 592 | 65 | 40 | 20 |
| 565 | 100 | 90 | 20 |
| 554 | 40 | 20 | |
| 467 | | 40 | 20 |
| 510 | 20 | | |
| 598 | 90 | 20 | 20 |
| 578 | | | 65 |
| 579 | 100 | 65 | 20 |
| 572 | 100 | 65 | 40 |
| 577 | 100 | 65 | 20 |
| 591 | 100 | 65 | 40 |
| 661 | 100 | 65 | 20 |
| 471 | 65 | 20 | 40 |
| 472 | 100 | 90 | |
| 662 | 50 | 25 | |

The compounds of the present invention may be employed as pesticides in a variety of ways.

For instance, the compounds of the present invention may be applied to plants as dispersions of wettable powder. Such a wettable powder may contain about equal parts by weight of a compound such as 466 and Attaclay, a finely divided clay, with a small quantity of a suitable wetting agent such as 2% Vatsol OT, a sulfonated alcohol wetting agent. The materials are ground together to produce a finely divided powder which may be stored and shipped in this form and added to water in the field to form a stable dispersion. Ordinarily, sufficient powder would be added to water to produce a concentration of from about 0.02% to 0.5% of 466 in a sprayable dispersion.

Another method of application of the compounds of the present invention is as a dust. For this purpose, the concentration of the active ingredient may vary from about 1% to 50% in the inert carrier. Suitable inert carriers include diatomaceous earth, bentonite, volcanic ash, talc, lignocellulosic flour, sulfur or mixture of these. One typical composition contains 5% of 578 and the balance pyrophyllite.

For many purposes, the compounds of the present invention may advantageously be applied as solutions in organic solvents. For instance, for impregnating fruit wrappers or boxes, one may prepare a 25% solution of 572 in acetone or ethanol and dip the articles to be treated in such a solution.

The compounds of the present invention are solids, or viscous liquids, and therefore should be placed in solution before one attempts to make emulsions of them. Emulsions may be easily prepared by making up a solution of the compounds in an organic solvent which is insoluble in water, such as xylene. Suitable wetting and dispersing agents can be added to solution and the solution then emulsified in water. As typical examples, 25% of 510 is dissolved in xylene and there is added thereto about 2% of Duponol 51, a sulfated higher aliphatic alcohol wetting agent. The solution may be readily dispersed in water and ordinarily would be dispersed in a concentration of about 0.02 to 0.5% of the 509 in the finished emulsion.

We claim:

1. The method of killing pests comprising applying to a pest habitat as the sole pesticidal agent a compound having the formula:

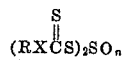

$$(RX\overset{\overset{S}{\|}}{C}S)_2SO_n$$

wherein $n$ is a member from 0 to 2, X is chosen from the group consisting of oxygen and sulfur, and R is a member chosen from the group consisting of saturated and unsaturated aliphatic radicals from 1 to 18 carbon atoms, cycloparaffin radicals, aryl radicals, and aralkyl radicals.

2. The method of claim 1 wherein R is a lower alkyl radical.

3. The method of killing pests comprising applying to a pest habitat as the sole pesticidal agent allyl xanthyl sulfide.

4. The method of killing pests comprising applying to a pest habitat as the sole pesticidal agent methyl xanthyl sulfide.

5. The method of killing pests comprising applying to a pest habitat as the sole pesticidal agent methyl xanthyl sulfoxide.

6. The method of killing pests comprising applying to a pest habitat as the sole pesticidal agent methyl xanthyl sulfone.

7. The method of killing pests comprising applying to a pest habitat as the sole pesticidal agent allyl xanthyl sulfone.

References Cited in the file of this patent

UNITED STATES PATENTS

| 1,788,632 | Powers | Jan. 13, 1931 |
| 2,150,759 | Carter | Mar. 14, 1939 |
| 2,250,545 | Mikeska | July 29, 1951 |

FOREIGN PATENTS

| 582,305 | Great Britain | Nov. 12, 1946 |